(12) United States Patent
Karri et al.

(10) Patent No.: US 11,676,317 B2
(45) Date of Patent: Jun. 13, 2023

(54) GENERATION OF CUSTOM COMPOSITE EMOJI IMAGES BASED ON USER-SELECTED INPUT FEED TYPES ASSOCIATED WITH INTERNET OF THINGS (IOT) DEVICE INPUT FEEDS

(71) Applicant: International Business Machines Corporation, Armonk, NY (US)

(72) Inventors: Venkata Vara Prasad Karri, Andhra Pradesh (IN); Sarbajit K. Rakshit, Kolkata (IN); Kamal Kiran Trood Yamala, Andhra Pradesh (IN); Ratnakumar Vadapalli, Andhra Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 17/241,495

(22) Filed: Apr. 27, 2021

(65) Prior Publication Data

US 2022/0343569 A1 Oct. 27, 2022

(51) Int. Cl.
G06F 40/166 (2020.01)
G06T 11/60 (2006.01)
G06F 3/01 (2006.01)

(52) U.S. Cl.
CPC .............. *G06T 11/60* (2013.01); *G06F 3/017* (2013.01); *G06F 40/166* (2020.01)

(58) Field of Classification Search
CPC ......... G06T 11/60; G06F 40/166; G06F 3/017
See application file for complete search history.

(56) References Cited

U.S. PATENT DOCUMENTS

| 9,870,552 | B2 | 1/2018 | Gupta |
| 2005/0163379 | A1 | 7/2005 | Zimmermann |
| 2017/0083506 | A1 | 3/2017 | Liu et al. |
| 2017/0140214 | A1 | 5/2017 | Matas et al. |
| 2017/0344224 | A1 | 11/2017 | Kay et al. |

(Continued)

OTHER PUBLICATIONS

Jackie Dove, "YourMoji keyboard for iOS lets you create emoji composites with your own photos," Jul. 2015, available from: http://web.archive.org/web/20151208194611/https://thenextweb.com/apps/2015/07/30/youmoji-keyboard-for-ios-lets-you-create-emoji-composites-with-your-own-photos/, pp. 1-7. (Year: 2015).*

(Continued)

*Primary Examiner* — Kyle R Stork
(74) *Attorney, Agent, or Firm* — Edell, Shapiro & Finnan, LLC

(57) ABSTRACT

Composite emoji images may be generated based on user-selected input feed types associated with various Internet of Things (IoT) device input feeds. A plurality of input feed type indicators corresponding to a plurality of input feed types may be displayed for user selection. The plurality of input feed types may be associated with a plurality of IoT device input feeds. A user selection of at least some of the plurality of input feed types may be received. A composite emoji image may be generated based on a composite of a base template emoji and individual emoji image layer portions that are generated according to the at least some of the plurality of input feed types of the user selection. For each real-time IoT device input feed, a current emoji image layer portion associated with the feed may be regularly updated for display to better enable the user selection.

13 Claims, 13 Drawing Sheets

(56) References Cited

U.S. PATENT DOCUMENTS

| | | | | |
|---|---|---|---|---|
| 2018/0027103 | A1* | 1/2018 | Chacon | H04M 1/72412 |
| | | | | 455/420 |
| 2019/0034976 | A1* | 1/2019 | Hamedi | G06Q 30/0204 |
| 2019/0122403 | A1 | 4/2019 | Woo et al. | |
| 2019/0197753 | A1* | 6/2019 | Alam | G06T 13/80 |
| 2019/0246233 | A1 | 8/2019 | Lyren | |
| 2019/0251728 | A1 | 8/2019 | Stoyles et al. | |
| 2019/0258850 | A1 | 8/2019 | Rihn et al. | |
| 2019/0311189 | A1 | 10/2019 | Bryant, III et al. | |
| 2020/0007672 | A1* | 1/2020 | Reyes | H04M 1/6066 |
| 2020/0110794 | A1 | 4/2020 | Vos et al. | |
| 2020/0117707 | A1 | 4/2020 | Liu et al. | |
| 2020/0174656 | A1 | 6/2020 | Shin et al. | |
| 2020/0388061 | A1 | 12/2020 | Woo et al. | |
| 2020/0388067 | A1 | 12/2020 | Stukalov | |

OTHER PUBLICATIONS

Disclosed Anonymously, "Method and System for Automatically Replying Emoticons Based on User Defined Context-Sensitive Triggers", ip.com, IPCOM000256447D, Nov. 30, 2018, 3 pages.

P. Bhor, et al., "Dynamic Emotion Recognition and Emoji Generation", International Research Journal of Engineering and Technology (IRJET), vol. 06, Issue: 09, Sep. 2019, 4 pages.

Krystal Lora, "Trying iOS 12 Features + Memoji!", YouTube Video, Jun. 6, 2018, https://www.youtube.com/watch?v=P1y9VQbfejs, (watch at 2:03), 2 pages.

LechCrunch, "iPhone X to include animoji, emojis animated based on your facial expressions", https://www.youtube.com/watch?v=kEGBkQhAQKk, Sep. 12, 2017, 2 pages.

Elana Lyn Grass, "How Emojis Have Made Their Way into Business :-)", Nov. 20, 2017, https://www.delltechnologies.com/en-us/perspectives/how-emojis-have-made-their-way-into-business/, 10 pages.

Vivian Rosenthal, "Why Emojis and Stickers Are Big Business", Aug. 19, 2016, https://www.forbes.com/sites/vivianrosenthal/2016/08/19/why-emojis-and-stickers-are-big-business/#641a43be4965, 6 pages.

Niel Patel, Blog, "Emoji Marketing: How to Use Emoticons to Significantly Increase Your Conversions", https://neilpatel.com/blog/emoji-marketing-how-to-use-emoticons-to-increase-your-conversions/, retrieved from Internet Apr. 27, 2021, 71 pages.

\* cited by examiner

US 11,676,317 B2

GENERATION OF CUSTOM COMPOSITE EMOJI IMAGES BASED ON USER-SELECTED INPUT FEED TYPES ASSOCIATED WITH INTERNET OF THINGS (IOT) DEVICE INPUT FEEDS

BACKGROUND

1. Technical Field

Present invention embodiments relate to emoji image generation, and more specifically, to the generation of custom composite emoji images based on user-selected input feed types associated with Internet of Things (IoT) device input feeds.

2. Discussion of the Related Art

Text messaging, instant messaging, and social networking applications for communicating messages amongst users are very popular. In messaging sessions, users are increasingly using emojis to express their mood. Emojis have become increasingly popular world-wide since their inclusion into smart phones. With emojis, both senders and receivers of messages are able to incorporate their emotion along with their typed-in text message. Many emojis are static Unicode characters or stickers/pictures which are built into the application or operating system (OS). If a user would like to better express himself or herself, he or she has to import many additional stickers or pictures.

While selecting an emoji, the user must select an appropriate emoji from a very large list in an emoji library. At some time, a specific type of emoji needed by the user may not be available, so the user may end up typing the message without the expression or have to embellish the text in another way.

SUMMARY

According to one embodiment of the present invention, a method of generating custom composite emoji images is performed. A plurality of input feed type indicators corresponding to a plurality of input feed types are displayed for user selection. The plurality of input feed types are associated with a plurality of Internet of Things (IoT) device input feeds. A user selection of at least some of the plurality of input feed types is received. A composite emoji image is generated based on a composite of a base template emoji and individual emoji image layer portions that are generated or selected according to the at least some of the plurality of input feed types of the user selection. Embodiments of the present invention further include a computer system and a computer program product for generating custom composite emoji images in substantially the same manner described above.

BRIEF DESCRIPTION OF THE DRAWINGS

Generally, like reference numerals in the various figures are utilized to designate like components.

DETAILED DESCRIPTION

Figure 1:
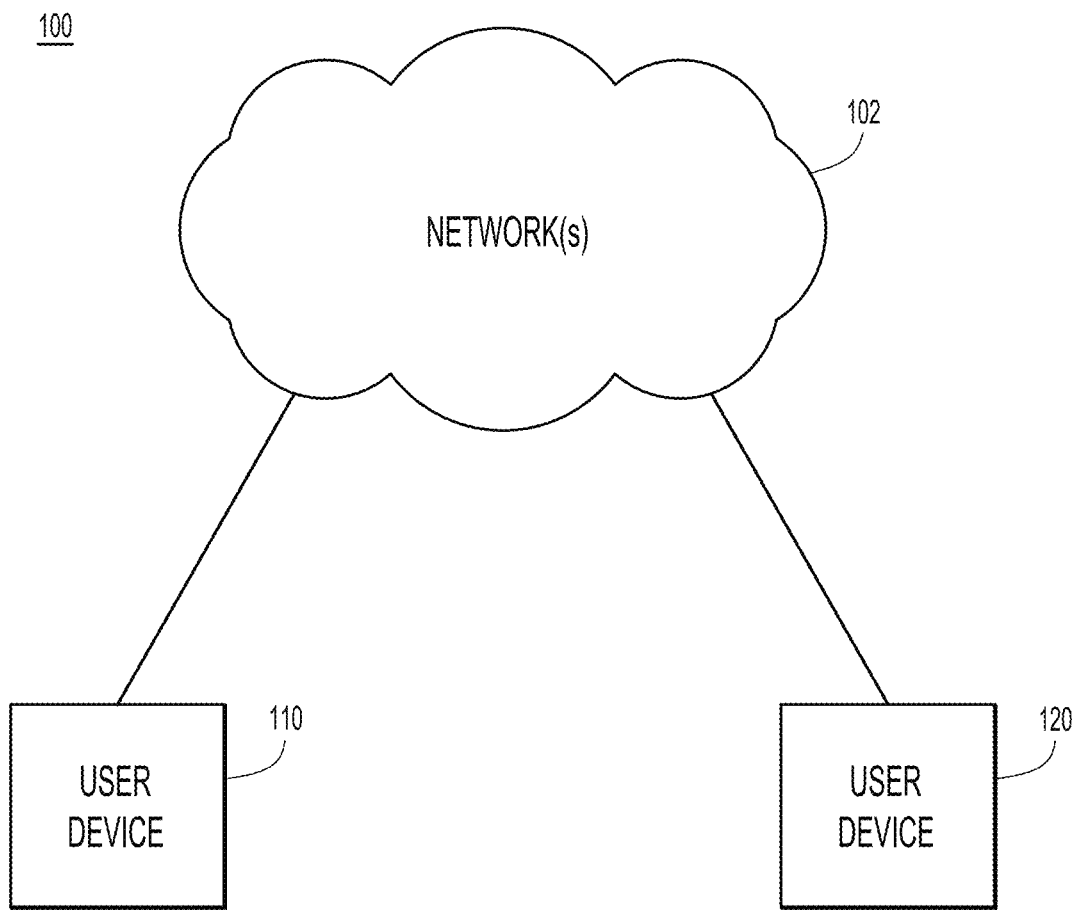
FIG. 1 is an illustrative representation of a communication system which includes a communication network and user devices which may communicate messages to each other via the communication network.
Figure 2:
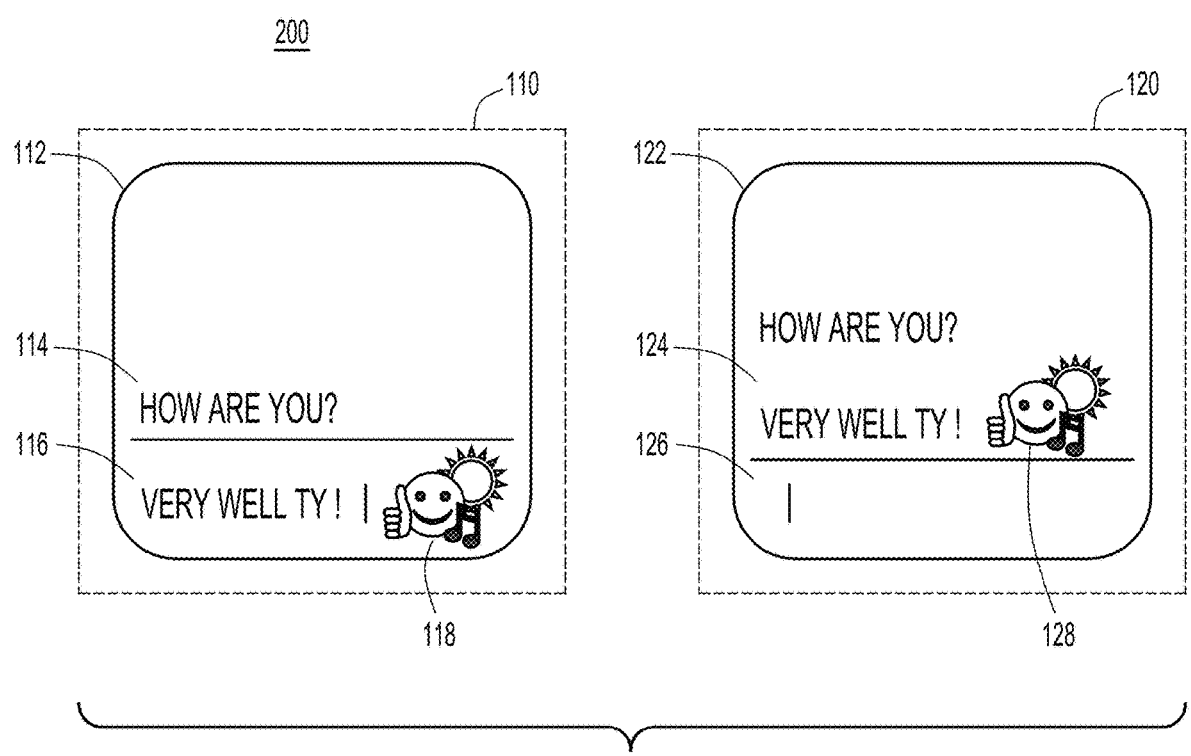
FIG. 2 is an illustrative representation of the user devices including their respective displays, showing a message having a "custom" composite emoji image that may be generated or selected at a user device and communicated in communication system of FIG. 1.

FIG. 1 is an illustrative representation of a communication system 100 which includes a communication network 102, a user device 110, and a user device 120. User devices 110 and 120 may utilize messaging software in a social networking application or the like for communicating messages to each other via communication network 102. In FIG. 2, a simplified illustrative representation of user devices 110 and 120 of FIG. 1, including their respective displays 112 and 122, is shown. As depicted, user devices 110 and 120 may communicate messages that are maintained in a conversation thread which is displayed in conversation thread fields 114 and 124, respectively, of the devices.

On the sending side, user device 110 may display a previously communicated message ("HOW ARE YOU?") in conversation thread field 114 of display 112. User device 110 may also display a current message ("VERY WELL TY !") that is currently being entered in a text entry field 116 of display 112. Notably, the current message in text entry field 116 may include a "custom" composite emoji image 118 which is generated at user device 110 according to some embodiments. On the receiving side, user device 120 may display the previously communicated messages ("HOW ARE YOU?" followed by "VERY WELL TY !") in conversation thread field 124 of display 122. User device 120 may also display an empty message (i.e. waiting for text entry) in a text entry field 126 of display 122. One of the previously communicated messages ("VERY WELL TY !") shown in conversation thread field 124 is from user device 110, and may include the "custom" composite emoji image which is indicated at user device 120 as a custom composite emoji image 128.

As will be described in more detail herein, composite emoji image 118 may be generated at user device 110 based on user-selected input feed types associated with various IoT device input feeds at user device 110. In particular, composite emoji image 118 may be generated based on a composite of a base emoji image and individual emoji image layer portions that are generated or selected according to at least some of the plurality of input feed types, received at user device 110, that correspond to a user's selection.

Figure 3:
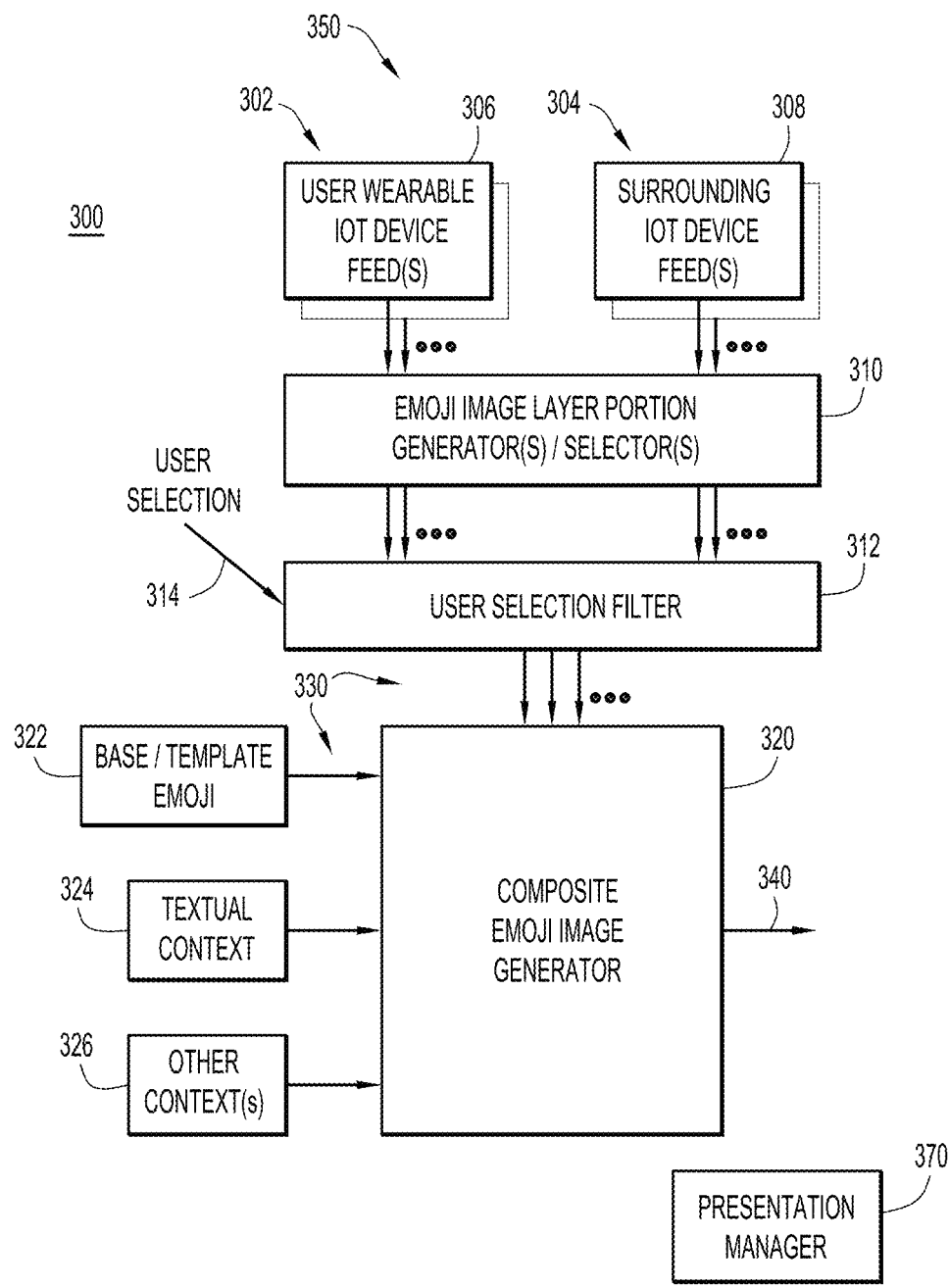
FIG. 3 is a schematic block diagram of an Internet of Things (IoT) device input feed based emoji image generator for generating custom composite emoji images according to some embodiments of the present disclosure.

FIG. 3 is a schematic block diagram of an IoT device input feed based emoji image generator 300 (or "IoT-based emoji generator" 300) according to some embodiments of the present disclosure. IoT-based emoji generator 300 may be included in the user device described in relation to FIGS. 1-2 and elsewhere herein. In some embodiments, a computer system of the user device may include a system memory and one or more processors configured to execute program modules of IoT-based emoji generator 300 that are stored in the system memory.

As shown in FIG. 3, IoT-based emoji generator 300 may include a composite emoji image generator 320 having a plurality of inputs 330 to receive various emoji image data (e.g. emojis, and/or emoji layers or layer portions) and an output 340 for producing a composite emoji image based on the various emoji image data. In particular, composite emoji image generator 300 may produce a composite emoji image based on a composite of a base template emoji 322 and individual emoji image layer portions that are generated or selected according to user-selected input feed types associated with a plurality of IoT device input feeds 350 received at the user device.

To achieve this, IoT-based emoji generator 300 may include one or more emoji image layer portion generators 310 associated with the plurality of IoT device input feeds 350. The one or more emoji image layer portion generators 310 are configured to generate a plurality of individual emoji image layer portions according to the plurality of IoT device input feeds 350. The plurality of IoT device input feeds 350 may be or include real-time IoT device input feeds. In some embodiments, the one or more emoji image layer portion generators 310 may be associated with one or more Application Programming Interfaces (APIs) of the user device for receiving data of the plurality of IoT device input feeds 350.

A user selection filter 312 may receive a user selection 314 (e.g. received via a user interface of the user device) of at least some of the plurality of input feed types associated with the plurality of IoT device input feeds 350. The user selection may be made by a user at a user interface of the user device, via a mouse, touch screen selection, voice commands, or gestures, as a few examples. Composite emoji image generator 320 may generate a composite emoji image based on base template emoji 322 and at least some of the individual emoji image layer portions that are generated or selected according to the at least some of the plurality of input feed types of this user selection 314. One illustrative example of such user selection 314 is provided later in relation to FIG. 7.

Composite emoji image generator 320 may produce the composite emoji image further based on emoji image data that is generated or selected according to textual context 324 of text of a message, as well as according to emoji image data based on other context(s) 326. Other context(s) 326 may include, notably, a location of the user device (e.g. a geo-location, a Wi-Fi network or Wi-Fi hotspot location, a social media check-in location, etc.).

The plurality of IoT device input feeds 350 may include a plurality of user-wearable IoT device input feeds 302, such as a user-wearable IoT device input feed 306, and a plurality of surrounding or ambient IoT device input feeds 304, such as a surrounding IoT device input feed 308.

User-wearable IoT devices or "wearable" IoT devices ("wearables") may include smartwatches, smart contact lenses, smartglasses, and the like. Other wearables include smart gloves, smart shoes, smart badges, smart rings, finger wearables, smart wrist bands, head band or caps, and thigh/leg wearables, and ankle wearables.

As one example, smartwatches are very popular and being used in various IoT applications, including healthcare and fitness. The use of smartwatches among cyclers, runners, gym-goers, swimmers, and athletes is increasing rapidly, owing to their wide-range of monitoring capabilities. Health and fitness oriented wearable devices that offer biometric measurements, such as heart rate, perspiration levels, and complex measurements like oxygen levels in the bloodstream, are also becoming available. The ability to sense, store, and track biometric measurements over time and then analyze these results is possible. Tracking body temperature, for example, might provide an early indication of whether the user may be catching a cold or the flu. The wireless synchronization of smartwatches with smartphones enables users to control music, notifications, alarms, auto-sleep, and other functions. Smart watches may have cameras as well as recording facilities.

As another illustrative example, smart contact lenses may include a micro-camera and sensors embedded on the surface, and may be controlled by blinking. Smart contact lens may be able to take photos or images, process data related to the photos or images, and carry out tasks based on the processed data. Some smart contact lenses may track and monitor the user's eye's or direction of the eyes. These smart contact lenses may enable the wearer to record everything that he or she sees. Smart contact lenses may also be able to integrate with augmented reality.

As even another example, smartglasses may be wearable computer glasses that associate information alongside or to what the wearer is able to see. Smartglasses may superimpose such information onto a field of view, which may be achieved with use of an optical head-mounted display (OHMD) or embedded wireless glasses having a transparent heads-up display (HUD) or augmented reality (AR) overlay. Such systems may have the capability to reflect projected digital images, as well as allow the user to see through it or see better with them. Like other computers, smartglasses may collect information from internal or external sensors, and may control or retrieve data from other instruments or computers. Smartglasses may support wireless technologies like Bluetooth, Wi-Fi, and GPS. Some models may run a mobile operating system and function as portable media players to send audio and video files to the user via a Bluetooth or Wi-Fi headset. Some smartglasses models also feature full lifelogging and activity tracker capability.

Again, the plurality of IoT device input feeds 350 may also include the plurality of surrounding (or ambient) IoT device input feeds 304, such as surrounding IoT device input feed 308. Surrounding or ambient IoT devices and/or associated feeds of a user device may include a weather feed, a temperature feed, an audio or sound system feed, a multimedia entertainment system feed, a local camera, an ambient sound monitoring IoT device (e.g. a microphone), a home automation input feed, a home appliance input feed, a current news feed, and a favorite channel of an online video sharing platform.

As one example, the audio or sound system feed may provide context for music listened to by the user, its style, genre, tempo, main instrument, etc. As another example, the multimedia entertainment system feed may provide context for multimedia, film, or video, etc., for film or video watched by the user, its genre, primary character(s), etc. As yet another example, the favorite channel of an online video sharing platform may provide context for content, including type, music, film, other, etc. The latter may be provided through the user device itself (e.g. a web browser or the like), the feed being provided in form of content metadata. As another example, a smart speaker with a virtual assistant technology, such as virtual assistant Artificial Intelligence (AI) technology, may be utilized. Here, the user may instruct a virtual assistant or the like with respect to target user details, in order to prompt a suggestion of a relevant meme, or audio/video (A/V) content that the sending and/or receiving user likes (e.g. has had historical data or personal connections to), etc.

IoT-based emoji generator 300 may also include a presentation manager 370 to provide image presentation data for display. According to some embodiments, for custom emoji image creation, presentation manager 370 may operate to cause a plurality of input feed type indicators corresponding to the plurality of input feed types to be displayed for user selection (along with other related image data). See e.g. the description of the presentation of FIG. 7 described later below. Presentation manager 370 may further operate to cause, for each real-time IoT device input feed, a current emoji image layer portion associated with the real-time IoT device input feed to be regularly updated for display. This may better enable the user selection for the user. Presentation manager 370 may further operate to cause one or more previous emoji image layer portions to be displayed along with the current emoji image layer portion.

Figure 4:
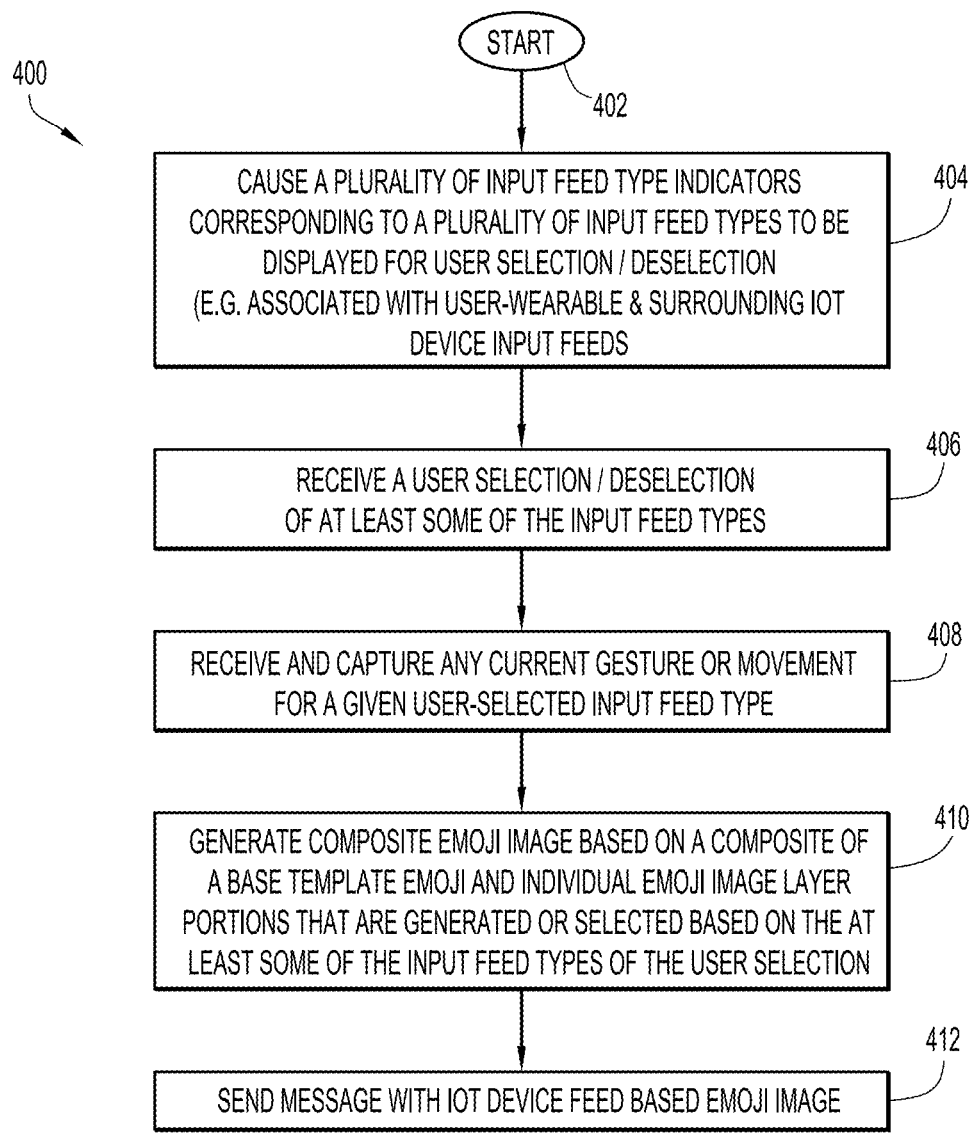
FIG. 4 is a flowchart for describing a method for use in generating custom composite emoji images according to some embodiments of the present disclosure.

With reference now to FIG. 4, a flowchart 400 for describing a method for use in generating composite emoji images according to some embodiments of the present disclosure is shown. The method may be performed by a user device configured to communicate messages via a network (e.g. user device 110 or 120 in the network 102 of FIG. 1). At least in some embodiments, the user device includes a computing system including one or more processing units and memory (e.g. the computing system of FIG. 10 described later below). The method may be embodied in a computer program product which includes a computer readable storage medium and computer readable program instructions stored in the computer readable storage medium, where the computer readable program instructions are executable by one or more processing units of the computing system.

Beginning at a start block 402 of FIG. 4, the user device may cause a plurality of input feed type indicators corresponding to a plurality of input feed types to be displayed for user selection (step 404 of FIG. 4). The plurality of input feed types may be associated with a plurality of IoT device input feeds. The user device may receive a user selection of at least some of the plurality of input feed types (step 406 of FIG. 4). The user selection may include a user selection of one or more input feed types as well as a user deselection of one or more other input feed types. The user selection can be made via a mouse, touch screen selection, voice commands, or gestures, as a few examples. In some embodiments, once the user selection is set, it may be maintained throughout operation until the user makes subsequent modifications. In some embodiments, the user device may receive and capture any current gesture or movement for a given user-selected input feed type (step 408 of FIG. 4).

The user device may generate a composite emoji image based on a composite of a base template emoji and individual emoji image layer portions that are generated or selected according to the at least some of the plurality of input feed types of the user selection (step 410 of FIG. 4). After generation of the composite emoji image, the user device may insert the composite emoji image in a message for communication to another user device, where the message is sent via a communication network (step 412 of FIG. 4). In some embodiments, the user device may (automatically) save the composite emoji image in an emoji library, for subsequent use as a base template emoji.

As described previously, the plurality of input feed types which are associated with the plurality of IoT device input feeds may comprise a plurality of real-time IoT device input feeds. In the displaying in step 404, for each real-time IoT device input feed, the user device may cause a current emoji image layer portion associated with a real-time IoT device input feed to be regularly updated for display for the user selection. This may be utilized to better enable the user selection for the user. For example, real-time IoT device input feeds may be regularly updated upon expiration of a time period (e.g. every 10 seconds, 1 minute, 15 minutes, etc.). The regular updating may be performed only when presentation 700 is displayed while the user is creating a custom emoji image. Also in the display in step 404, for each real-time IoT device input feed, the user device may cause one or more previous emoji image layer portions associated with the real-time IoT device input feed to be displayed along with the current emoji image layer portion.

Figure 5:
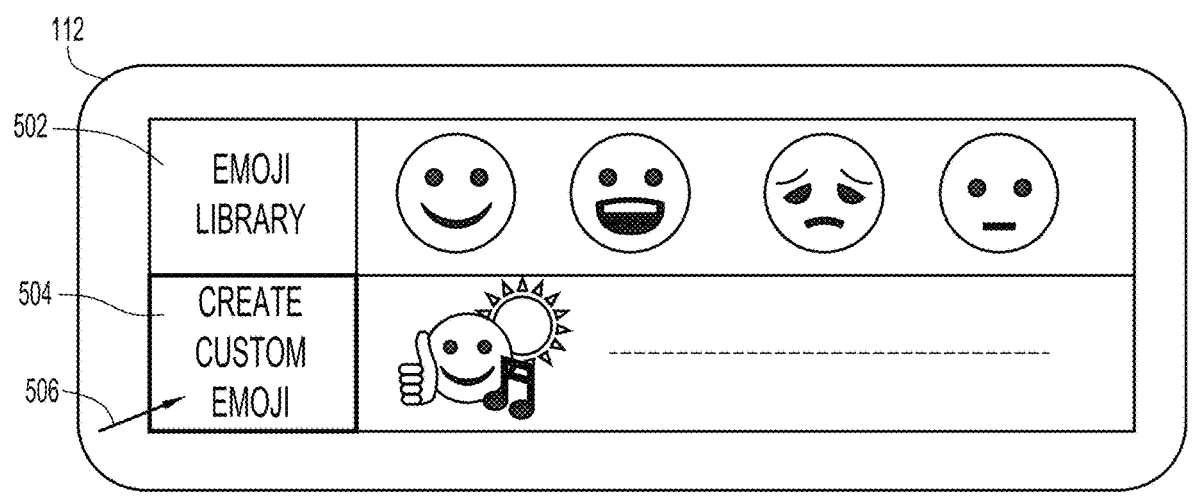
FIG. 5 is an example of a presentation in a display of a user device, where the presentation includes an emoji library presentation of emojis and a create custom emoji option indication for user selection.

FIG. 5 is an example of a presentation in display 112 of the user device, where the presentation includes an emoji library presentation 502 and a create custom emoji option indication 504 for user selection according to some embodiments. This example presentation, or "pop-up" presentation, may be displayed in response to a user selection of an indication at or near a text input field of display 112 during user entry of a message.

As shown in FIG. 5, emoji library presentation 502 may include a plurality of "standard" emojis of different emoji types for user selection (e.g. with use of a movable cursor 506 or touch position). In this specific example, emoji library presentation 502 includes a smiling face emoji, a grinning face emoji with big eyes, a worried face emoji, and a neutral face emoji. As another option of the user, create custom emoji option indication 504 may be associated one or more custom emojis that were previously user-generated, custom emojis. As is apparent, custom emojis which may be selected or created with custom emoji option indication 504 may be included as part of emoji library presentation 502. In response to a user selection of create custom emoji option indication 504 (e.g. with use of movable cursor 506, touch screen, touch actuation or position, etc.), a procedure for creating custom emojis may be initiated (e.g. the method described in relation to FIG. 2, as well as the remaining figures).

Figure 6A:
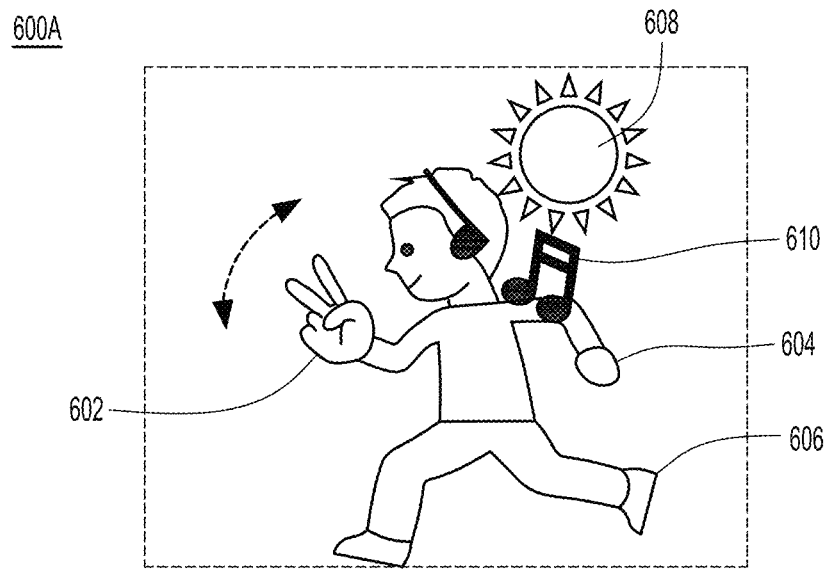
FIGS. 6A-6C are examples of custom composite emoji images that may be generated based on user-selected input feed types associated with IoT device input feeds according to some embodiments.
Figure 6B:
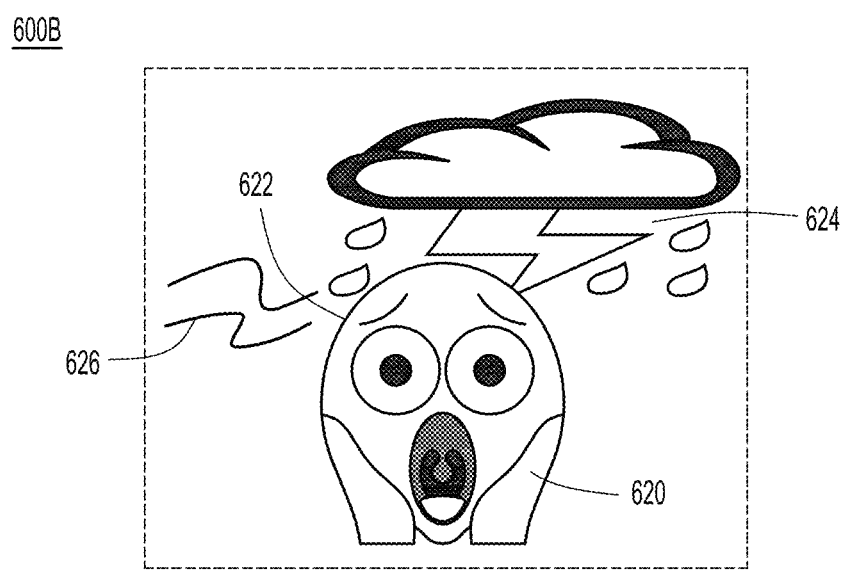
Figure 6C:
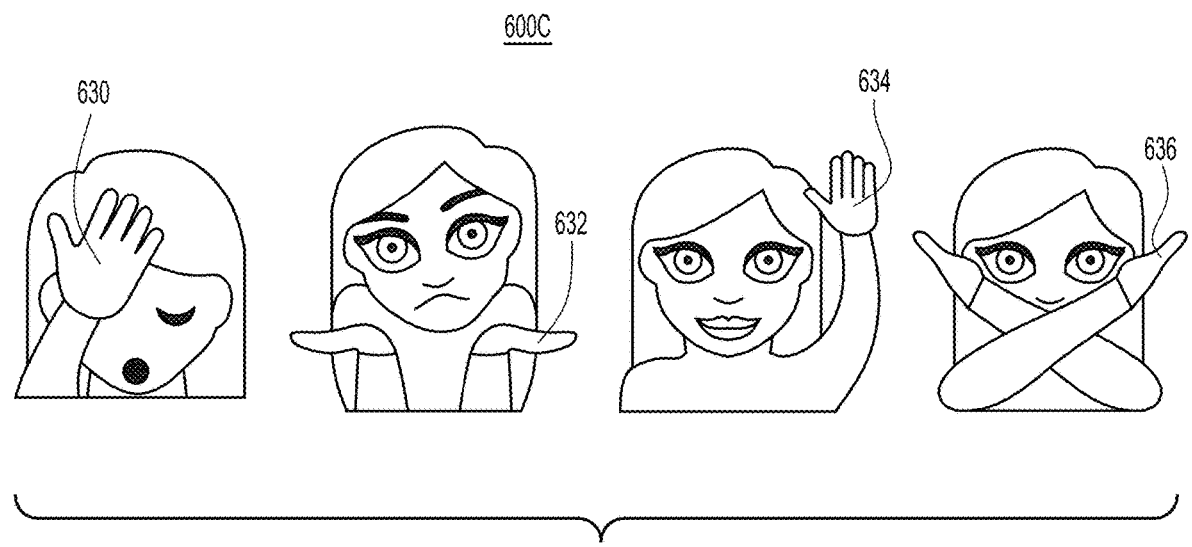

FIGS. 6A, 6B, and 6C are examples of custom composite emoji images 600A, 600B, and 600C, respectively, that may be generated based on user-selected input feed types associated with IoT device input feeds according to some embodiments. For example, these custom composite emoji images 600A, 600B, and 600C may be generated and utilized in the environment described in relation to FIGS. 1-5 and 7.

Here, each custom composite emoji image may be generated based on a composite of a base template emoji and individual emoji image layer portions that are generated or selected according to at least some of a plurality of input feed types that are selected by the user. At least in some instances, the base template emoji may be utilized as a default base when other input feeds are not active or neutral (e.g. a smiley face may be utilized as a default when the user's face is otherwise expression-less). Although some of these composite emoji images may appear to resemble or even replicate standard emojis, they all may be created according to techniques of the present disclosure.

More particularly, in FIG. 6A, custom composite emoji image 600A is custom-generated based on a composite of a base template emoji (e.g. a standard smiling face emoji; or a head-to-toe, person type A emoji) and individual emoji image layer portions 602, 604, 606, 608, and 610. Individual emoji image layer portion 602 (i.e. a waving peace sign) may be a peace sign emoji layer portion (e.g. waving in animation) that is generated or selected according to an input feed type associated with an IoT device input feed of a smart watch, a smart glove, or one or more finger wearables. Individual emoji image layer portion 604 (i.e. an extended arm) may be an arm emoji layer portion that is generated or selected according to an input feed type associated with an IoT device input feed of a smart wrist band. Individual emoji image layer portion 606 (i.e. an extended leg or foot) may be a leg or foot emoji layer portion that is generated or selected according to an input feed type associated with an IoT device input feed of a thigh/leg wearable or smart shoes. Individual emoji image layer portion 608 (i.e. a bright sun) may be a sun emoji layer portion that is generated or selected according to an input feed type associated with a weather input feed. Individual emoji image layer portion 610 (e.g. general music) may be a general music emoji layer portion that is generated or selected according to an input feed type associated with a sound IoT device input feed (e.g. from a microphone, or audio detection or player system). Custom composite emoji image 600A may be generated based on a user selection of the above-mentioned input feed types and a deselection of all others.

In FIG. 6B, custom composite emoji image 600B is custom-generated based on a composite of a base template emoji (e.g. an astonished face emoji 622) and individual emoji image layer portions 620, 624, and 626. Custom composite emoji image 600B may resemble and even meant to replicate, at least in part, a standard emoji of a face screaming in fear. Individual emoji image layer portion 620 (i.e. hands on both cheeks) may be a hand emoji layer portion that is generated or selected according to an input feed type associated with an IoT device input feed of a smart glove or a smart wrist band. Individual emoji image layer portion 624 (i.e. a cloud with lightning and rain) may be a cloud with lightning and rain emoji layer portion that is generated or selected according to an input feed type associated with a weather input feed. Individual emoji image layer portion 626 (i.e. a heavy wind) may be a heavy wind emoji layer portion that is generated or selected according to an input feed type associated with a wind monitoring input feed (e.g. separate from the weather input feed). Again, custom composite emoji image 600A may be generated based on a user selection of the above-mentioned input feed types and a deselection of all others.

In FIG. 6C, a series of custom composite emoji images 600C may be custom-generated, where each may be based on a composite of a base template emoji (e.g. a standard smiling face emoji; or a blonde, face type B emoji; etc.) and one or more individual emoji image layer portions. Individual emoji image layer portions 630, 632, 634, and 636 are different arm/hand emoji layer portions that are generated or selected according to an input feed type associated with an IoT device input feed of a smart watch, a smart glove, or a smart wrist band. Facial expressions in the custom composite emoji images 600C of FIG. 6C may be provided using different facial expression emoji layer portions that are generated or selected according to an input feed type associated with a camera device input feed or other.

As illustrated in FIG. 6C, individual emoji image layer portion 630 in the first of the series of composite emoji images 600C is shown to have captured the user's hand making contact with the user's forehead. Individual emoji image layer portion 632 in the second of the series of composite emoji images 600C is shown to have captured both hands of the user with palms faced upwards. Individual emoji image layer portion 634 in the third of the series of composite emoji images 600C is shown to have captured the user's left hand upwards in a "hello" position. Individual emoji image layer portion 636 in the fourth of the series of composite emoji images 600C is shown to have captured the user's arms crossed upwards in front of the user.

Figure 7:
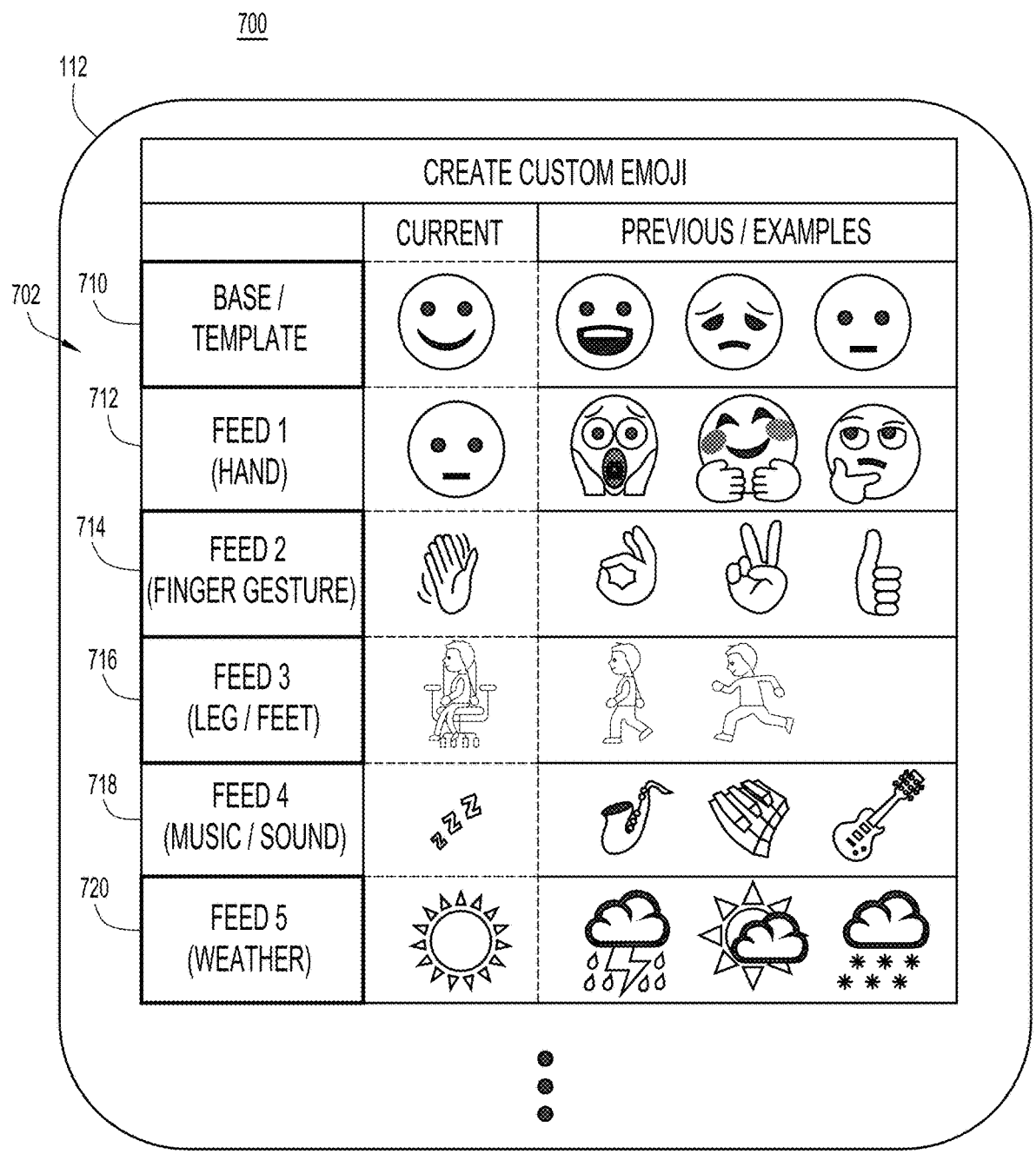
FIG. 7 is an example of a presentation in a display of a user device, where the presentation is for creating custom composite emoji images according to some embodiments, and includes a current emoji image layer portion associated with each real-time IoT device input feed which is regularly updated in the display, as well as one or more previous emoji image layer portions associated with each IoT device input feed to be displayed along with the current emoji image layer portion.

FIG. 7 is an example of a presentation 700 in display 112 of the user device, where the presentation 700 may be utilized for the creation of custom composite emoji images according to some embodiments. Presentation 700 of FIG. 7 may be produced with use of a presentation manager in the IoT-based emoji generator (e.g. presentation manager 370 of FIG. 3). Example custom composite emoji images that may be created have been previously described in relation to FIGS. 6A, 6B, and 6C, as well as to be described later in relation to FIGS. 9A and 9B.

Presentation 700 may include an indicator 710 for user selection of a base template emoji from a plurality of base template emojis. Here, presentation 700 may present a "current" base template emoji (e.g. a standard smiling face emoji, as shown) and one or more "previous" base template emojis (e.g. a grinning face emoji with big eyes, a worried face emoji, and a neutral face emoji, as shown in order) to be displayed along with the current emoji image layer portion.

Presentation 700 may also include a plurality of input feed type indicators 702 corresponding to a plurality of input feed types to be displayed for user selection. Presentation 700 includes a plurality of input feed type indicators 702 corresponding to a plurality of input feed types to be displayed for user selection. The plurality of input feed types are associated with a plurality of different input feeds, which include IoT device input feeds as described herein. The user selection can be made via a mouse, touch screen selection, voice commands, or gestures, as a few examples. In some embodiments, once the user selection is set, it may be maintained throughout operation until the user makes subsequent modifications. For each one of the input feed types 702, presentation 700 may present a "current" emoji image layer portion and one or more "previous" emoji image layer portions to be displayed along with the current emoji image layer portion.

Each one of the input feed type indicators 702 corresponding to the various input feed types is now described. An input feed type indicator 712 corresponds to an input feed type that is named FEED 1 (feed for hand position or placement) and is associated with an IoT device input feed of a smart watch, a smart wrist band, or smart gloves. For this input feed type, presentation 700 may include a current emoji layer portion (e.g. inactive or not positioned, as indicated), and one or more previous emoji layer portions (e.g. hands on both cheeks, hands close to body, and thinking face hand position, as shown in order) to be displayed along with the current emoji image layer portion. Input feed type that is named FEED 1 (feed for hand position or placement) is shown as deselected by the user (not bold or highlighted).

An input feed type indicator 714 corresponds to an input feed type that is named FEED 2 (feed for finger gesture and/or movement) and is associated with an IoT device input feed of a smart ring or a finger "wearable." For this input feed type, presentation 700 may include a current emoji layer portion (e.g. finger/hand waving, as indicated) and one or more previous emoji layer portions (e.g. OK gesture, peace sign gesture, and thumbs up gesture, as shown in order) to be displayed along with the current emoji image layer portion. The input feed type that is named FEED 2 (feed for finger gesture and/or movement) is shown as selected by the user (bold or highlighted).

An input feed type indicator 716 corresponds to an input feed type that is named FEED 3 (feed for leg and feet position or movement) and is associated with an IoT device input feed of smart shoes or a thigh/leg wearable. For this input feed type, presentation 700 may include a current emoji layer portion (e.g. at rest sitting in chair, as shown) and one or more previous emoji layer portions (e.g. walking pace position, running pace position, as shown in order) to be displayed along with the current emoji image layer portion. Input feed type that is named FEED 3 (feed for leg and feet position or movement) is shown as selected by the user (bold or highlighted).

An input feed type indicator 718 corresponds to an input feed type that is named FEED 4 (feed for music including main or dominant instrument) and is associated with associated with a sound IoT device input feed (e.g. from a microphone, or audio detection or player system). For this input feed type, presentation 700 may include a current emoji layer portion (e.g. quiet or no music indicator) and one or more previous emoji layer portions (e.g. saxophone music, keyboard music, rock guitar music, as shown in order) to be displayed along with the current emoji image layer portion. Input feed type that is named FEED 4 (feed for music including main or dominant instrument) is shown as deselected (not bold or highlighted).

An input feed type indicator 720 corresponds to an input feed type that is named FEED 5 (feed for the weather) and is associated with associated with a weather input feed. For this input feed type, presentation 700 may present a current emoji layer portion (e.g. a bright sun) and one or more previous emoji layer portions (e.g. cloud with rain and lightning, a sun behind cloud, and a cloud with snow, as shown in order) to be displayed along with the current emoji image layer portion. Input feed type that is named FEED 5 (feed for the weather) is shown as selected (bold or highlighted).

In some preferred embodiments, presentation 700 may include the current emoji image layer portion associated with a real-time IoT device input feed, to be regularly updated for display to better enable user selection. For example, the current emoji image layer portion may be regularly updated upon expiration of a time period (e.g. every 10 seconds, 1 minute, 15 minutes, etc.). In some of these embodiments, the regular updating may be performed only when presentation 700 is displayed while the user is creating a custom emoji image.

Figure 8A:
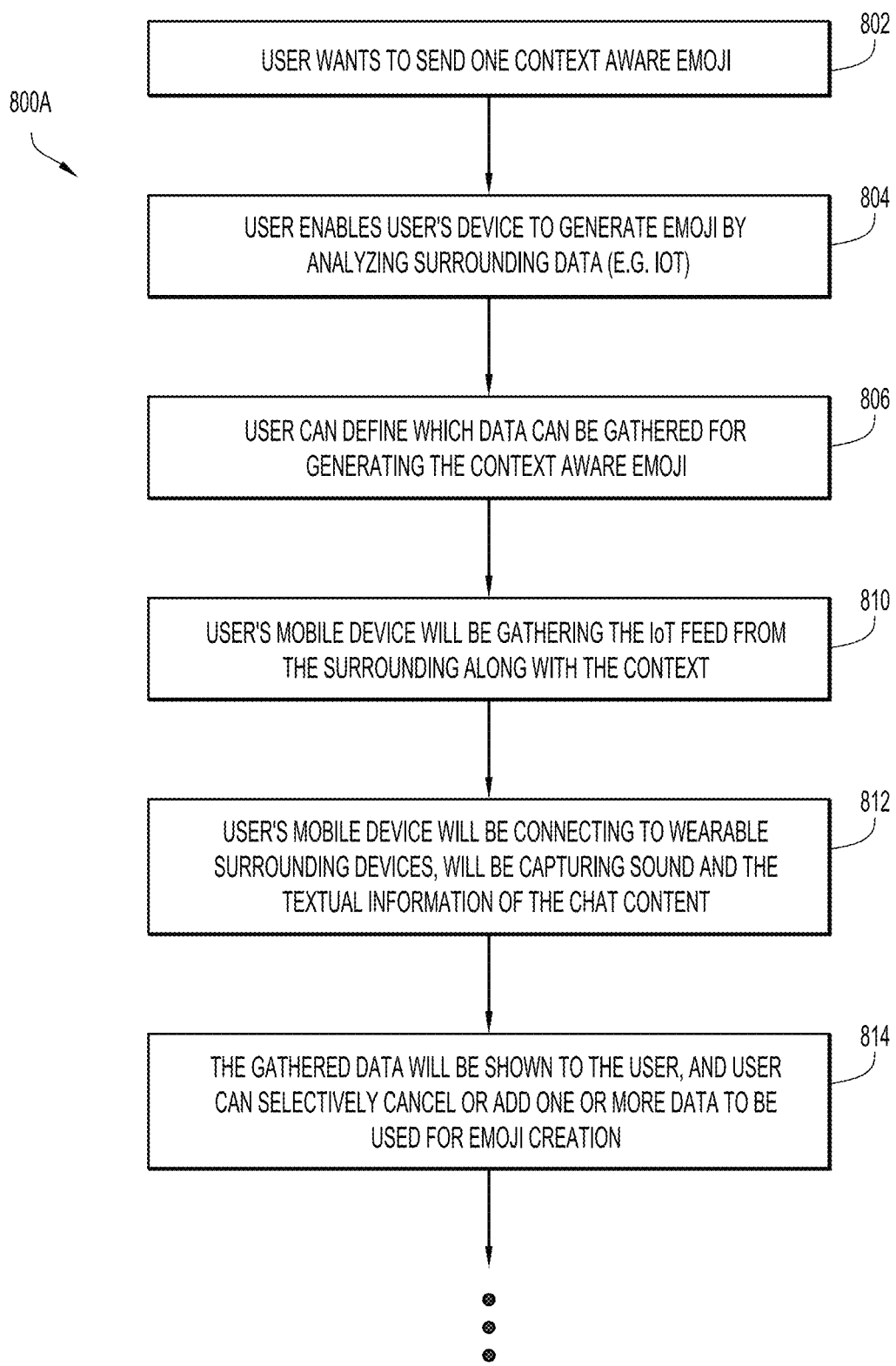
FIGS. 8A-8B form a flowchart for describing a method for use in generating custom, context-aware emojis according to some embodiments of the present disclosure.
Figure 8B:
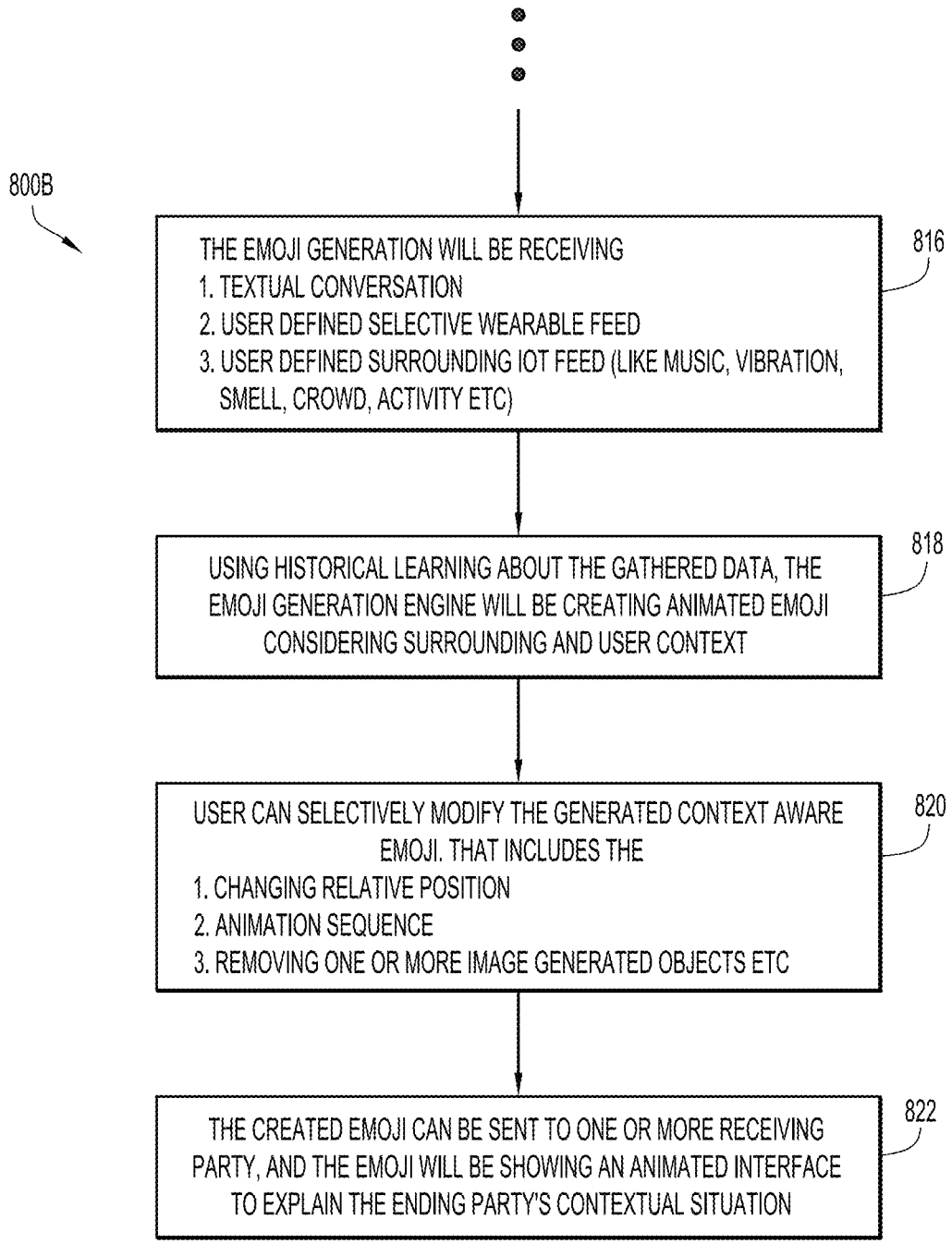

Alternative embodiments and variations are now described in relation to FIGS. 8A and 8B. With reference now to FIGS. 8A and 8B, a flowchart 800A/800B for describing a method for use in generating custom "context-aware" emojis (or custom composite emoji images) according to some embodiments of the present disclosure is shown. The method of FIGS. 8A and 8B may be considered to be a more specific embodiment of the techniques of the present disclosure. The method may be performed by a user device configured to communicate messages via a network (e.g. user device 110 or 120 in the network 102 of FIG. 1). At least in some embodiments, the user device includes a computing system including one or more processing units and memory (see e.g. later description of the computing system of FIG. 10). The method may be embodied in a computer program product which includes a computer readable storage medium and computer readable program instructions stored in the computer readable storage medium, where the computer readable program instructions are executable by one or more processing units of the computing system.

In FIG. 8A, a user having a user device may want to create and send a custom, "context-aware" emoji (step 802 of FIG. 8A). The user may enable the user device to initiate the generation of the emoji, by enabling analysis of surrounding input feeds (step 804 of FIG. 8A). Here, the user may define or select which data feed may be gathered at the user device for generating the context-aware emoji (step 806 of FIG. 8A). The user device will gather the input feed from the surrounding based on the user selection, along with the context (step 810 of FIG. 8A). The user device will also connect to user-wearable devices of the user, capturing sound and the textual information of text of the message (step 812 of FIG. 8A). The gathered data will be display to the user, where the user can selectively add or cancel one or more data to be used for emoji creation (step 814 of FIG. 8A).

Continuing in FIG. 8B, accordingly, an emoji generation engine of the user device will be receiving textual conversation, user-defined selected user-wearable input feeds, and user—defined surrounding input feeds (step 816 of FIG. 8B). Using the historical learning about the gathered data, the emoji generation engine will create an animated emoji based on the surrounding and user context (step 818 of FIG. 8B). The user may selectively modify the generated context-aware emoji, including changing the relative position of the emoji, providing an animation sequence, and/or removing one or more image-generated objects (step 820 of FIG. 8B). Once the context-aware emoji is created, the user device may send a message having the emoji to one or more receiving parties. In some cases, the context-aware emoji may be illustrated in an animated fashion to explain the sending party's contextual situation (step 822 of FIG. 8B).

Accordingly, in some embodiments, while preparing to send a message including an emoji to a recipient, the user can modify a user-selected emoji based on one or more sensor feeds from user-wearables and/or the surrounding devices. These sensors feeds may update the selected emoji on a real-time basis. While selecting an emoji, the user can create an emoji based on the user's interest (e.g. outside weather, which may be raining; or an in-house cartoon character being played by a multimedia system, etc.) at that point in time. The user may reciprocate to the message received by any action (a gesture or otherwise) that is suitable as a response to convey his or her reply in emoji form. Accordingly, while the emoji is being modified by one or more IoT device feed signals from the user-wearable or surrounding, the user can selectively define which IoT signals are to be considered among the plurality of input feed signals and for what to dynamically modify the emoji.

In some embodiments, at a given time, the user is able to select two or more emojis from the emoji library and, with a hand gesture, the user can create a single emoji from the emojis. Accordingly, the user is able to create a contextual relationship among the selected emojis and share the same to the recipient.

In some embodiments, the message that user sent or received will be parsed to create or suggest an equivalent emoji as a response based on the user's historical responses, context, etc., when a similar situation arises. Once any modified emoji is sent to any recipient, then user can also alter the animation behavior or even the shape of the emoji based on the IoT based signals created by the user.

In some embodiments, modification behavior of the emojis may be learned, and therefore, the same may be created dynamically and with recommendations of appropriate modification of the emoji for the user.

In some embodiments, a smart speaker with a virtual assistant technology, such as virtual assistant AI technology, may be utilized. Here, the sending user may instruct the virtual assistant with respect to target user details, in order to prompt a suggestion of a meme or A/V or multimedia content that the sending and/or receiving user likes (e.g. has had historical data or personal connections to). In response, the emoji may be auto-modified and stored in the emoji library.

According to embodiments of the present disclosure, messaging software in a social networking application may provide an emoji library. Each and every emoji in the emoji library may be considered to be a base template for an emoji to be created or modified. Each emoji in the emoji library may be able to be selected individually, and multiple emojis may be selected at a given time. An emoji editing API may be provided such that, when any emoji is selected, the selected emoji may be displayed for editing. The emoji editing API will provide editing capability for modifying the emoji based on an IoT device input feed(s) of the surrounding IoT device input feed(s). Each and every emoji may be constructed with multiple parts (e.g. multiple individual emoji image layer portions), and each and every part may be uniquely identifiable, have its own metadata, and be individually editable.

The emoji editing API may receive the IoT sensor input feed and the emoji will be edited based on the IoT sensor feed. The position of the IoT devices may be uniquely identified, for example, wearable devices may identify the hands, smart contact lens may identify the position of the eyes, etc. At a given time, the user may select multiple emojis and the same will be shown on the emoji editing API on the user device. While the selected emojis are displayed on the emoji editing API, then the same can be used for editing the emojis. Any emoji may be selected from the emoji editing API and then edited.

When an emoji is selected on the emoji editing API, the user can select to perform various actions. The IoT devices will be tracking user's activities, e.g. walking, blinking, movement, hand-based movement, etc. The IoT device input feed will be transmitted or communicated to the emoji editing API and, accordingly, different portions of the emojis (e.g. various individual emoji image layer portions) will be showing appropriate orientation and movement. As different portion of emoji is mapped with different portion of body and the IoT sensor positions ae also mapped, so the proposed system will identify which portion of the emoji needs to be modified. The modified emoji will be shown in the emoji editing API, and accordingly, the user's mobility or actions will also be recorded. Based on the action or movement, an animated emoji may be created. At a given time, the user can select multiple emojis and then, with a finger gesture, the user is able to create a correlation with the emojis, and can create a combined emoji from multiple individual emojis (e.g. individual emoji image layer portions). Along with the IoT sensor feed, user can also perform touch interaction with the display and accordingly the emojis can be modified.

Figure 9A:
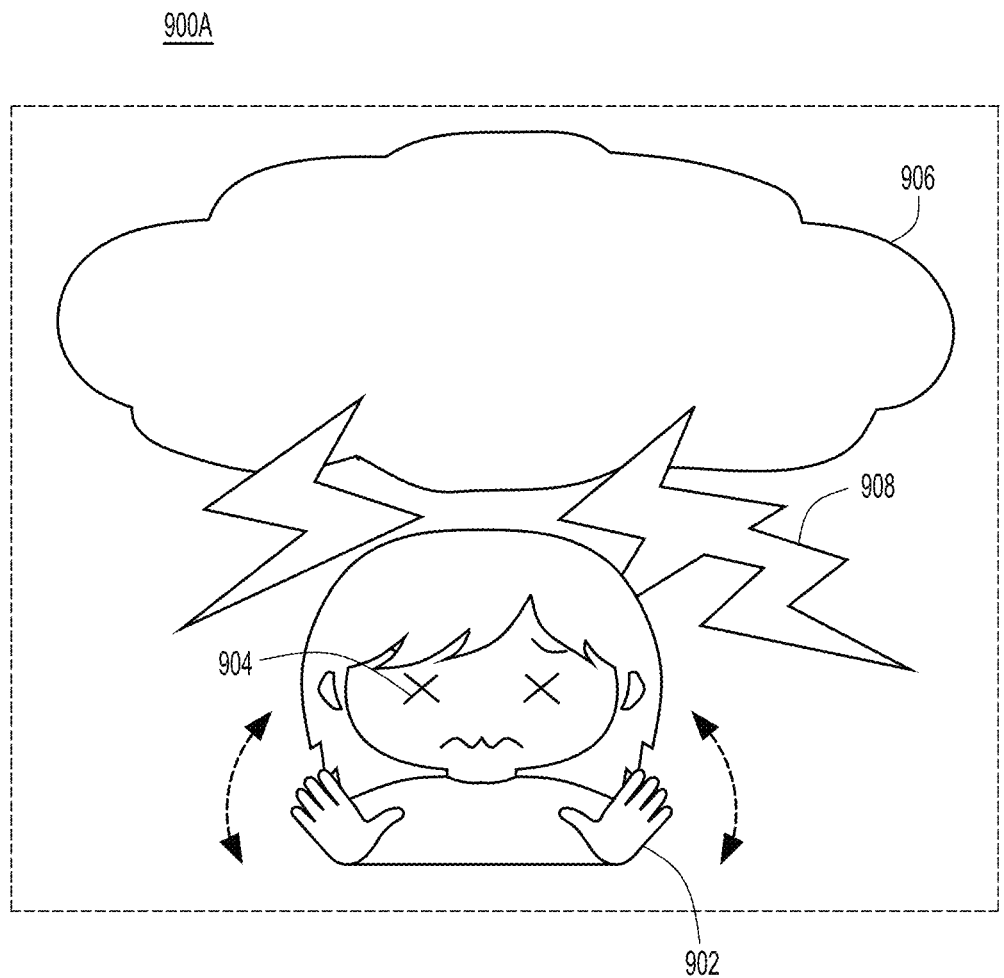
FIG. 9A is an additional example of a custom composite emoji image that may be generated based on user-selected input feed types associated with IoT device input feeds according to some embodiments.

FIG. 9A is another example of a custom composite emoji image 900A that may be generated based on user-selected input feed types associated with IoT device input feeds according to some embodiments. In FIG. 9A, custom composite emoji image 900A is custom-generated based on a composite of a base template emoji (e.g. a dark-haired, face type C emoji) and individual emoji image layer portions 902, 904, 906, and 908. Individual emoji image layer portion 902 (i.e. waving open hands) may be an emoji layer portion (e.g. waving in animation) that is generated or selected according to an input feed type associated with an IoT device input feed of a smart watch, a smart wrist band, or smart gloves. Individual emoji image layer portion 904 (i.e. eyes squeezed shut) may be an eyes squeezed shut emoji layer portion that is generated or selected according to an input feed type associated with an IoT device input feed of smart contact lenses or smartglasses. Individual emoji image layer portion 906 (i.e. a storm cloud) may be a storm cloud emoji layer portion that is generated or selected according to an input feed type associated with a weather input feed. Individual emoji image layer portion 908 (i.e. lightning) may be a lightning emoji layer portion that is generated or selected according to an input feed type associated with a weather input feed or camera. Custom composite emoji image 900A may be generated based on a user selection of the above-mentioned input feed types and a deselection of all others.

Figure 9B:
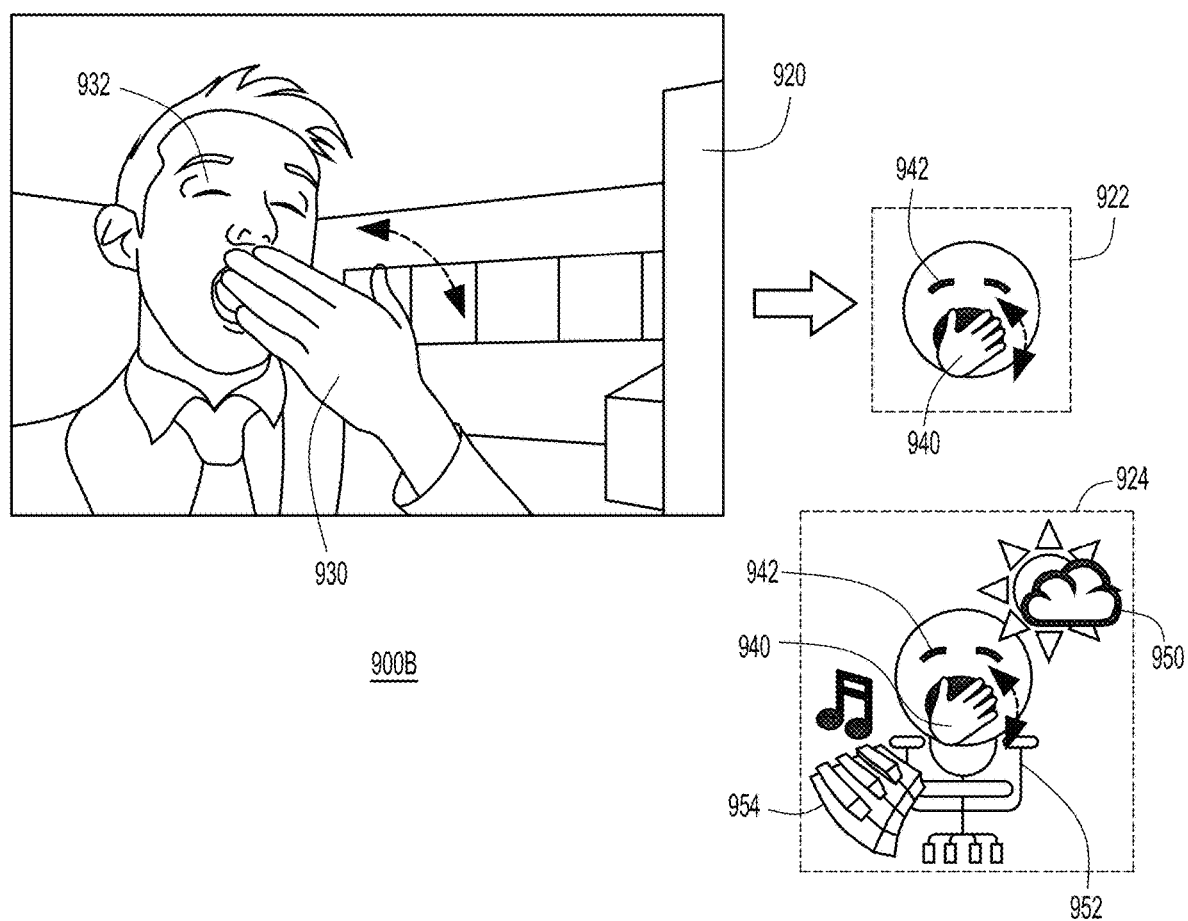
FIG. 9B is an illustrative diagram showing other examples of custom composite emoji images corresponding to a user scenario depiction, each of which may be generated based on user-selected input feed types associated with IoT device input feeds according to some embodiments.

FIG. 9B is an illustrative diagram 900B showing other examples of custom composite emoji images 922 and 924 which may be generated based on user-selected input feed types associated with IoT device input feeds according to some embodiments. Custom composite emoji images 922 and 924 may correspond to a user scenario depiction 920, which shows a businessman in an office, yawning with his hand waving over his mouth.

In FIG. 9B, custom composite emoji image 922 is custom-generated based on a composite of a base template emoji (e.g. a standard smiling face emoji) and individual emoji image layer portions 940 and 942. Custom composite emoji image 922 may resemble and even meant to replicate, at least in part, a standard emoji of a yawning face. Individual emoji image layer portion 940 (i.e. hand waving over open mouth) may be a arm/hand emoji layer portion that is generated or selected according to an input feed type associated with an IoT device input feed of a smart watch, smart gloves, a smart wrist band. Individual emoji image layer portion 942 (i.e. eyes squinting) may be an eyes squinting emoji layer portion that is generated or selected according to an input feed type associated with an IoT device input feed of smart contact lenses or smartglasses. Custom composite emoji image 922 may be generated based on a user selection of the above-mentioned input feed types and a deselection of all others.

With reference now to custom composite emoji image 924 of FIG. 9B, individual emoji image layer portion 950 (i.e. a sun behind cloud) may be a sun behind cloud emoji layer portion that is generated or selected according to an input feed type associated with a weather input feed. Individual emoji image layer portion 952 (e.g. office chair) may be an office chair emoji layer portion that is generated or selected according to location (e.g. geo-location, Wi-Fi network or Wi-Fi hotspot location, social media check-in location, etc.), and/or according to an input feed type associated with an IoT device input feed of smart shoes or a thigh/leg wearable. Individual emoji image layer portion 954 (e.g. music notes with keyboard) may be a music with keyboard emoji layer portion that is generated or selected according to an input feed type associated with a sound IoT device input feed (e.g. from a microphone, or audio detection or player system) which distinguishes, by sound or metadata, amongst types of main instruments, genres, style, and tempo.

In some preferred embodiments, individual emoji image layer portions may be generated or selected in a more accurate manner utilizing data from two or more different input feeds of different input feed types. With respect to the above example of FIG. 9B, individual emoji image layer portion 952 (e.g. the office chair) may be an office chair emoji layer portion that is generated or selected according to location (e.g. geo-location, Wi-Fi network or Wi-Fi hotspot location, social media check-in location, etc.), and an IoT device input feed of smart shoes or a thigh/leg wearable.

Figure 10:
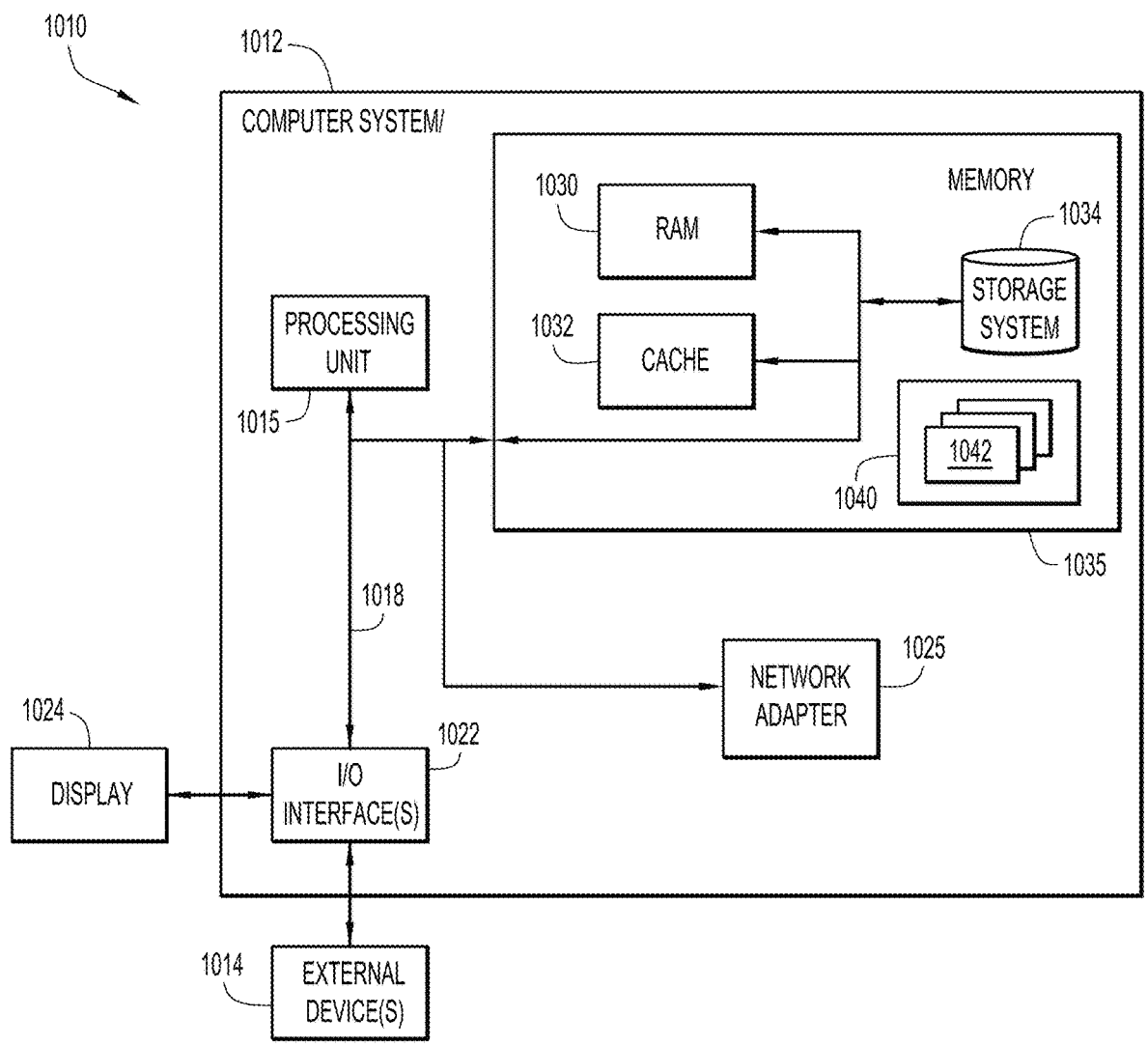
FIG. 10 is schematic block diagram of an example of a computing device for operation in the relevant computing environment, as a user device for operation in a communication system of FIG. 1 as described herein.

Referring now to FIG. 10, a schematic diagram of an example of a computing device 1010 which may operate in a computing environment is shown. Computing device 1010 is only one example of a suitable user device for the relevant computing environment of the present disclosure (i.e. user device 110 or user device 120 of communication system 100 of FIG. 1), and is not intended to suggest any limitation as to the scope of use or functionality of embodiments of the invention described herein. Regardless, computing device 1010 is capable of being implemented and/or performing any of the functionality set forth herein.

In computing device 1010, there is a computer system 1012 which is operational with numerous other general purpose or special purpose computing system environments or configurations. Examples of well-known computing systems, environments, and/or configurations that may be suitable for use with computer system 1012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 1012 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 10, computer system 1012 is shown in the form of a general-purpose computing device. The components of computer system 1012 may include, but are not limited to, one or more processors or processing units 1015, a system memory 1035, and a bus 1018 that couples various system components including system memory 1035 to processing units 1015.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 1012 typically includes a variety of computer system readable media. Such media may be any available media that is accessible by computer system 1012, and it includes both volatile and non-volatile media, removable and non-removable media.

System memory 1035 can include computer system readable media in the form of volatile memory, such as random access memory (RAM) 1030 and/or cache memory 1032. Computer system 1012 may further include other removable/non-removable, volatile/non-volatile computer system storage media. By way of example only, storage system 1034 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1035 may include at least one program product having a set (e.g., at least one) of program modules that are configured to carry out the functions of embodiments of the invention.

Program/utility 1040, having a set (at least one) of program modules 1042 (e.g., a composite emoji image generator, an emoji image layer portion generator or selector, a user selection filter, a presentation manager, etc.) may be stored in memory 1035 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system 1012 may also communicate with one or more external devices 1014 such as a keyboard, a pointing device, a display 1024, etc.; one or more devices that enable a user to interact with computer system 1012; and/or any devices (e.g., network card, modem, etc.) that enable computer system 1012 to communicate with one or more other computing devices. Such communication can occur via Input/Output (I/O) interfaces 1022. Still yet, computer system 1012 can communicate with one or more networks such as a local area network (LAN), a general wide area network (WAN), and/or a public network (e.g., the Internet) via network adapter 1025. As depicted, network adapter 1025 communicates with the other components of computer system 1012 via bus 1018. It should be understood that although not shown, other hardware and/or software components could be used in conjunction with computer system 1012. Examples, include, but are not limited to: microcode, device drivers, redundant processing units, external disk drive arrays, RAID systems, tape drives, and data archival storage systems, etc.

It will be appreciated that the embodiments described above and illustrated in the drawings represent only a few of the many ways of implementing embodiments for the generation of composite emoji images based on user-selected input feed types associated with IoT device input feeds.

The environment of the present invention embodiments may include any number of computer or other processing systems (e.g., client or end-user systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, social networking application software, messaging software, browser software, server software, etc.). These systems may include any types of monitors and input devices (e.g., keyboard, mouse, voice recognition, etc.) to enter and/or view information.

It is to be understood that the software of the present invention embodiments (e.g., the IoT-based emoji image generator, or portions thereof, including the emoji image layer portion generator(s) or selector(s), the user selection filter, the composite emoji image generator, the presentation manager, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., the IoT device input feed based emoji image generator, or portions thereof, including the emoji image layer portion generator or selector, the user selection filter, the composite emoji image generator, the presentation manager, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., emoji library information, emoji images, emoji image layer portions, etc.). The database system may be implemented by any number of any conventional or other databases, data stores or storage structures (e.g., files, databases, data structures, data or other repositories, etc.) to store information (e.g., emoji library information, emoji images, emoji image layer portions, etc.). The database system may be included within or coupled to the server and/or client systems. The database systems and/or storage structures may be remote from or local to the computer or other processing systems, and may store any desired data (e.g., emoji library information, emoji images, emoji image layer portions, etc.).

The present invention embodiments may employ any number of any type of user interface (e.g., Graphical User Interface (GUI), command-line, prompt, etc.) for obtaining or providing information (e.g., user selection information), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be varied according to requirements and/or tools utilized as one ordinarily skilled in the art would readily appreciate.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of generating custom composite emoji images, comprising:
    causing a plurality of input feed type indicators corresponding to a plurality of input feed types to be displayed on a user interface of a first user device for user selection, the plurality of input feed types being associated with a plurality of Internet of Things (IoT) device input feeds pertaining to user biometrics, activity, and environment, wherein the plurality of input feed types which are associated with the plurality of IoT device input feeds comprise a plurality of real-time IoT device input feeds, and causing the plurality of input feed type indicators to be displayed further comprises:
        displaying on the user interface for the input feed type indicators a current emoji image layer portion and one or more previous emoji image layer portions for corresponding ones of the plurality of real-time IoT device input feeds to present plural variations of emoji layer portions for the input feed type indicators for the corresponding ones of the plurality of real-time IoT device input feeds; and
        updating the current emoji layer portion for the input feed type indicators for the corresponding ones of the plurality of real-time IoT device input feeds from a previous emoji layer portion on a real-time basis on the user interface during user selection of the input feed type indicators based on real-time data from the plurality of real-time IoT device input feeds;
    receiving a user selection on the user interface of input feed type indicators corresponding to at least two of the plurality of input feed types each associated with a different Internet of Things (IoT) device based on the plural variations of the emoji layer portions;
    selecting a base template emoji from an emoji library;
    generating an individual emoji image layer portion for each of the at least two input feed types of the user selection, wherein each individual emoji image layer portion graphically conveys information of a corresponding input feed type;
    generating a composite emoji image by combining the base template emoji and the individual emoji image layer portions to modify the base template emoji according to the information of the at least two input feed types of the user selection;
    inserting the composite emoji image in a message for communication to a second user device via a communication network;
    receiving over the communication network a text message entered by a second user from the second user device;
    parsing the text message to determine context of the text message; and
    dynamically creating a second composite emoji image with one or more of the input feed types for response to the text message based on user historical responses to messages and the context of the text message.

2. The method of claim 1, further comprising:
    receiving and capturing a gesture or movement associated with one of the at least two of the input feed types of the user selection; and
    generating one of the individual emoji image layer portions to include the gesture or movement.

3. The method of claim 1, wherein generating the composite emoji image is further based on an individual emoji image layer portion that is generated or selected according to a textual context of text in a message.

4. The method of claim 1, further comprising:
    saving the composite emoji image in the emoji library, for subsequent use as a base template emoji.

5. The method of claim 1, which is performed by the first user device, and wherein the plurality of input feed types which are associated with the plurality of IoT device input feeds comprise a plurality of user-wearable IoT device input feeds associated with a plurality of user-wearable IoT devices that connect to the first user device.

6. The method of claim 5, wherein the plurality of user-wearable IoT devices comprise at least some of the following: a smartwatch, smart contact lenses, smartglasses, smart gloves, smart shoes, a smart badge, a smart ring, a finger wearable, a smart wrist band, a head band or cap, a thigh/leg wearable, and an ankle wearable.

7. The method of claim 1, which is performed by the first user device, wherein the plurality of input feed types which are associated with the plurality of IoT device input feeds comprise a plurality of surrounding IoT device input feeds associated with a plurality of surrounding IoT devices.

8. The method of claim 7, wherein the plurality of surrounding IoT devices or associated feeds comprise one or more from a group of: a weather feed, a temperature feed, an audio or sound system, a multimedia entertainment system, a local camera, an ambient sound monitoring IoT device, a home automation input feed, a home appliance input feed, a current news feed, and a favorite channel of an online video sharing platform.

9. The method of claim 1, which is performed by the first user device, and wherein generating the composite emoji image is further based on an individual emoji image layer portion that is generated or selected according to a location of the first user device.

10. A computer system for generating custom composite emoji images, the computer system comprising:
    a system memory;
    one or more processors configured to execute program modules stored in the system memory, the program modules causing the one or more processors to:
        cause a plurality of input feed type indicators corresponding to a plurality of input feed types to be displayed on a user interface on a first user device for user selection, the plurality of input feed types being associated with a plurality of Internet of Things (IoT) device input feeds pertaining to user biometrics, activity, and environment, wherein the plurality of input feed types which are associated with the plurality of IoT device input feeds comprise a plurality of real-time IoT device input feeds, and causing the plurality of input feed type indicators to be displayed further comprises:
            displaying on the user interface for the input feed type indicators a current emoji image layer portion and one or more previous emoji image layer portions for corresponding ones of the plurality of real-time IoT device input feeds to present plural variations of emoji layer portions for the input feed type indicators for the corresponding ones of the plurality of real-time IoT device input feeds; and updating the current emoji layer portion for the input feed type indicators for the corresponding ones of the plurality of real-time IoT device input feeds from a previous emoji layer portion on a real-time basis on the user interface during user selection of the input feed type indicators based on real-time data from the plurality of real-time IoT device input feeds;

receive a user selection on the user interface of input feed type indicators corresponding to at least two of the plurality of input feed types each associated with a different Internet of Things (IoT) device based on the plural variations of the emoji layer portions;

select a base template emoji from an emoji library;

generate an individual emoji image layer portion for each of the at least two input feed types of the user selection, wherein each individual emoji image layer portion graphically conveys information of a corresponding input feed type;

generate a composite emoji image by combining the base template emoji and the individual emoji image layer portions to modify the base template emoji according to the information of the at least two input feed types of the user selection;

insert the composite emoji image in a message for communication to a second user device via a communication network;

receive over the communication network a text message entered by a second user from the second user device;

parse the text message to determine context of the text message; and dynamically create a second composite emoji image with one or more of the input feed types for response to the text message based on user historical responses to messages and the context of the text message.

11. A computer program product for generating custom composite emoji images, the computer program product comprising one or more computer readable storage media having computer program instructions collectively stored on the one or more computer readable storage media, the computer program instructions being executable by a first user device to cause the first user device to:

cause a plurality of input feed type indicators corresponding to a plurality of input feed types to be displayed on a user interface of the first user device for user selection, the plurality of input feed types being associated with a plurality of Internet of Things (IoT) device input feeds pertaining to user biometrics, activity, and environment, wherein the plurality of input feed types which are associated with the plurality of IoT device input feeds comprise a plurality of real-time IoT device input feeds, and causing the plurality of input feed type indicators to be displayed further comprises:

displaying on the user interface for the input feed type indicators a current emoji image layer portion and one or more previous emoji image layer portions for corresponding ones of the plurality of real-time IoT device input feeds to present plural variations of emoji layer portions for the input feed type indicators for the corresponding ones of the plurality of real-time IoT device input feeds; and updating the current emoji layer portion for the input feed type indicators for the corresponding ones of the plurality of real-time IoT device input feeds from a previous emoji layer portion on a real-time basis on the user interface during user selection of the input feed type indicators based on real-time data from the plurality of real-time IoT device input feeds;

receive a user selection on the user interface of input feed type indicators corresponding to at least two of the plurality of input feed types each associated with a different Internet of Things (IoT) device based on the plural variations of the emoji layer portions;

select a base template emoji from an emoji library;

generate an individual emoji image layer portion for each of the at least two input feed types of the user selection, wherein each individual emoji image layer portion graphically conveys information of a corresponding input feed type;

generate a composite emoji image by combining the base template emoji and the individual emoji image layer portions to modify the base template emoji according to the information of the at least two input feed types of the user selection;

insert the composite emoji image in a message for communication to a second user device via a communication network;

receive over the communication network a text message entered by a second user from the second user device;

parse the text message to determine context of the text message; and dynamically create a second composite emoji image with one or more of the input feed types for response to the text message based on user historical responses to messages and the context of the text message.

12. The computer program product of claim 11, wherein the program instructions are executable by the first user device to further cause the first user device to:

receive and capture a gesture or movement associated with one of the at least two of the input feed types of the user selection; and generate one of the individual emoji image layer portions to include the gesture or movement.

13. The computer program product of claim 11, wherein the program instructions are executable by the first user device to further cause the first user device to:

save the composite emoji image in the emoji library, for subsequent use as a base template emoji.

* * * * *